(12) United States Patent
Dodson et al.

(10) Patent No.: US 8,015,330 B2
(45) Date of Patent: Sep. 6, 2011

(54) READ CONTROL IN A COMPUTER I/O INTERCONNECT

(75) Inventors: Jeffrey Michael Dodson, Portland, OR (US); Nagamanivel Balasubramaniyan, Sunnyvale, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 0 days.

(21) Appl. No.: 13/020,702

(22) Filed: Feb. 3, 2011

(65) Prior Publication Data
US 2011/0125947 A1 May 26, 2011

Related U.S. Application Data

(62) Division of application No. 12/105,733, filed on Apr. 18, 2008.

(60) Provisional application No. 61/015,613, filed on Dec. 20, 2007, provisional application No. 61/014,685, filed on Dec. 18, 2007.

(51) Int. Cl.
*G06F 11/00* (2006.01)
*G06F 15/16* (2006.01)
*G06F 3/00* (2006.01)

(52) U.S. Cl. .......... 710/52; 370/229; 370/235; 709/230; 709/232; 709/233; 709/234; 709/235; 710/29; 710/57

(58) Field of Classification Search .................. 370/229, 370/235; 709/230, 232–235; 710/1, 29, 710/32–34, 52, 56, 57, 100, 240, 300, 305, 710/310, 311, 314; 711/167, 169
See application file for complete search history.

(56) References Cited

U.S. PATENT DOCUMENTS

| 5,987,507 A | 11/1999 | Creedon et al. |
| 6,425,024 B1 | 7/2002 | Kelley et al. |
| 2005/0198459 A1 | 9/2005 | Bogin et al. |

*Primary Examiner* — Alford W Kindred
*Assistant Examiner* — Richard B Franklin
(74) *Attorney, Agent, or Firm* — Beyer Law Group LLP

(57) ABSTRACT

In one embodiment, a method for controlling reads in a computer input/output (I/O) interconnect is provided. A read request is received over the computer I/O interconnect from a first device, the request requesting data of a first size. Then it is determined whether fulfilling the read request would cause the total size of a completion queue to exceed a first predefined threshold. If fulfilling the read request would cause the total size of the completion queue to exceed the first predefined threshold, then the read request is temporarily restricted from being forwarded upstream.

18 Claims, 3 Drawing Sheets

US 8,015,330 B2

READ CONTROL IN A COMPUTER I/O INTERCONNECT

CROSS REFERENCE TO RELATED APPLICATIONS

This application is a divisional of prior, co-pending U.S. application Ser. No. 12/105,733, filed on Apr. 18, 2008, which claims priority under 35 U.S.C. 119(e) to (i) U.S. Provisional Patent Application No. 61/014,685, filed on Dec. 18, 2007, entitled "PLX ARCHITECTURE," by George Apostol, and (ii) U.S. Provisional Patent Application No. 61/015,613 filed on Dec. 20, 2007, entitled "PLX SOFTWARE DEVELOPMENT KIT," by George Apostol. All of the foregoing are incorporated by reference in their entirety for all purposes.

BACKGROUND OF THE INVENTION

1. Field of the Invention

The present invention relates generally to computer I/O interconnects. More particularly, the present invention relates to read control in a computer I/O interconnect.

2. Description of the Related Art

In a computer architecture, a bus is a subsystem that transfers data between computer components inside a computer or between computers. Unlike a point-to-point connection, a different type of computer input/output (I/O) interconnect, a bus can logically connect several peripherals over the same set of wires. Each bus defines its set of connectors to physically plug devices, cards or cables together.

There are many different computer I/O interconnect standards available. One of the most popular over the years has been the peripheral component interconnect (PCI) standard. PCI allows the bus to act like a bridge, which isolates a local processor bus from the peripherals, allowing a Central Processing Unit (CPU) of the computer to run must faster.

Recently, a successor to PCI has been popularized. Termed PCI Express (or, simply, PCIe). PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express switch fabric comprised of one or more switch devices (embodiments are also possible without switches, however). In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple switch devices can be connected to ports on the root complex or cascaded.

PCI Express also supports split read completions. This means that the completion of read request initiated at a particular time may not be performed until a later time. Essentially, the read request must wait in a queue until it is serviced. Since a request is typically only 12-20 bytes, whereas the size of a completion response can range up to 4096 bytes, there is a natural imbalance where requests can accumulate faster than data can be returned.

This relative size imbalance between requests and completion data responses can negatively affect performance if too many requests are active at one time. This is especially true in a typical PCIe system where multiple downstream devices all try to read from a single root complex, and wherein the root complex typically services the read requests in a first-come-first-served fashion. If the requests are for large amounts of data, a long read request queue can develop in the root complex as it services the requests. This long queue can be exacerbated if the final data destination (the source of the read request) has less bandwidth than the data supplier (the request destination), which is common in host-centric PCIe systems, where the link closest to the root complex is typically the widest. Once intermediary buffers are filled, the bandwidth of the root complex effectively reduces to the bandwidth of the data sink.

If a new downstream device sends its first read request into this long queue of requests in the destination, the new read request will wait for the entire read request queue ahead of it to drain before it will get serviced. The long wait time for a response can dramatically impact performance.

For example, suppose a PCIe switch connects a single x8 upstream port to two x4 downstream ports. One downstream port has a FibreChannel RAM disk that is capable of sending 16 1024 byte memory read requests at a time. The other downstream port is a dual Gigabit Ethernet controller that can send 2 read requests at a time (1 per channel), with the read size being either 16 bytes (for a descriptor) or 1500 bytes (for an Ethernet packet). The root complex sends 64 byte completions, so a 1024 byte read request would result in 16 partial completions.

By itself, the Ethernet controller may process 1885 Mb/s with a memory read latency of an Ethernet channel being around 340 ns. When the FibreChannel RAM disk is plugged in, however, the FibreChannel RAM disk processes 752 MB/s of completions (the same as it normally does) while the Ethernet controller performs 180 Mb/s. Here the memory read latency of the Ethernet channel is around 6200 ns. Thus, when both devices are on, the FibreChannel RAM Disk interferes with the Ethernet controller even though the FibreChannel RAM Disk performance itself was not affected. This is because the FibreChannel RAM Disk initially fills the switch's buffer with completions at a x8 rate, but then the upstream bandwidth drops to a x4 rate, due to the switch's downstream link to the FibreChannel device being only x4. Due to the congestion, the Ethernet controller takes much longer to get data back, as seen from the increased latency. Since the Ethernet device can have only 2 reads outstanding, a longer response for those reads results in a major drop in performance.

The above example illustrates how the aggressive reading behavior of one device can dramatically and negatively affect another PCIe device. There is nothing forbidden about this configuration, and by themselves the devices each seem to perform quite well, making this a problem that a cursory analysis of the system would not reveal.

SUMMARY OF THE INVENTION

In one embodiment, a method for controlling reads in a computer input/output (I/O) interconnect is provided. A read request is received over the computer I/O interconnect from a first device, the request requesting data of a first size. Then it is determined whether fulfilling the read request would cause the total size of a completion queue to exceed a first predefined threshold. If fulfilling the read request would cause the total size of the completion queue to exceed the first predefined threshold, then the read request is temporarily restricted from being forwarded upstream In another embodiment, a read request is received over the computer I/O interconnect from a first device. Then it is determined if forwarding the read request upstream would cause the rate at which read requests are forwarded to exceed a drain rate of a completion queue by more than a predefined threshold. If forwarding the read request upstream would cause the rate at which read requests are forwarded upstream to exceed a drain rate of the completion queue by more than the predefined threshold, then the read request is temporarily restricted from being forwarded upstream.

In another embodiment a system is provided comprising: an interface; and one or more components configured to: receive a read request over the computer I/O interconnect from a first device, the request requesting data of a first size; determine whether fulfilling the read request would cause the total size of a completion queue to exceed a first predefined threshold; and temporarily restrict the read request from being forwarded upstream if fulfilling the read request would cause the total size of the completion queue to exceed the first predefined threshold.

In another embodiment, a system is provided comprising: an interface; and one or more processors configured to: receive a read request over the computer I/O interconnect from a first device; determine if forwarding the read request upstream would cause the rate at which read requests are forwarded to exceed a drain rate of a completion queue by more than a predefined threshold; and temporarily restrict the read request from being forwarded upstream if forwarding the read request upstream would cause the rate at which read requests are forwarded upstream to exceed a drain rate of the completion queue by more than the predefined threshold.

DETAILED DESCRIPTION OF SPECIFIC EMBODIMENTS

Figure 1:
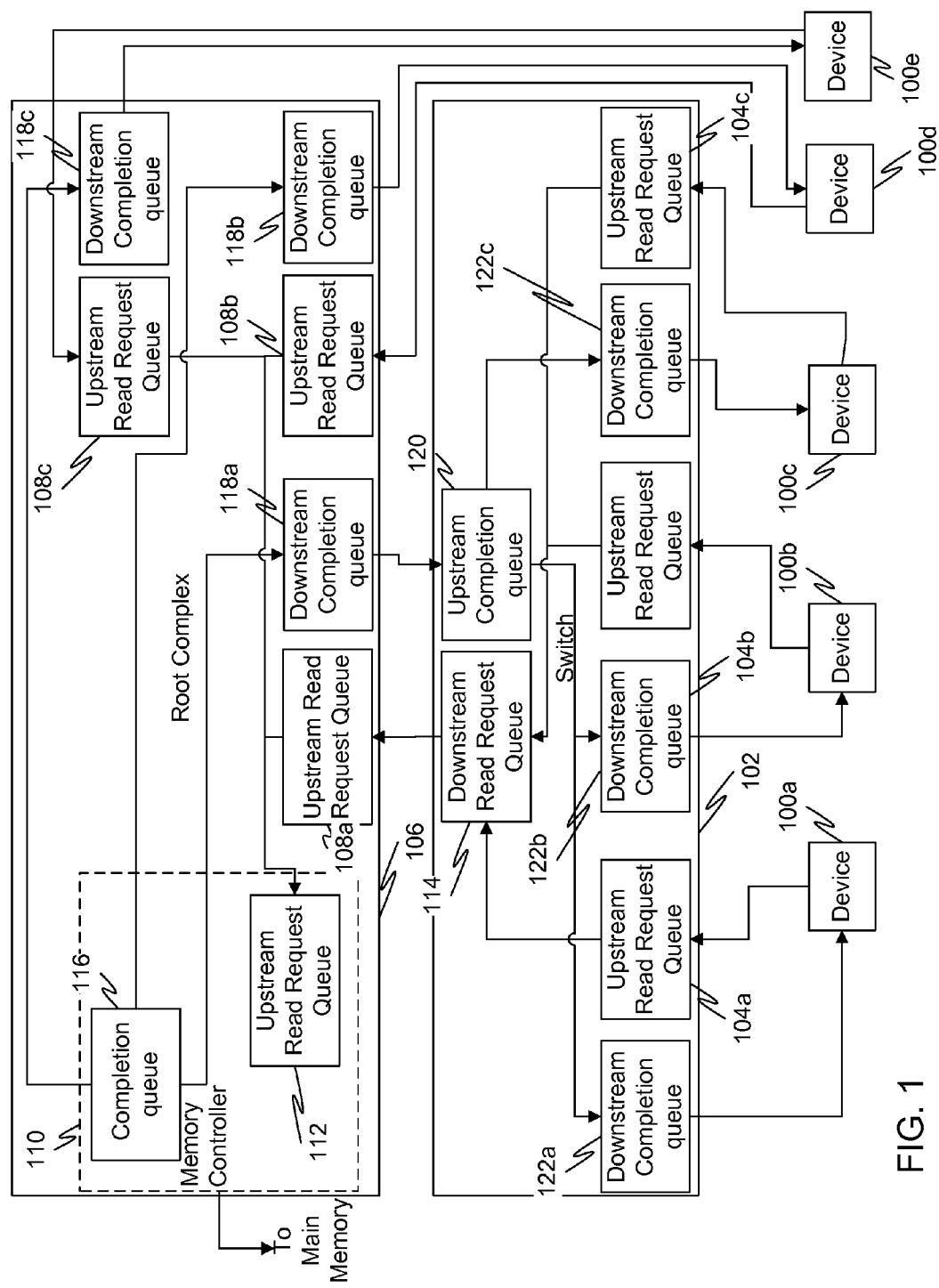
FIG. 1 is a block diagram illustrating a system for controlling reads in a computer I/O interconnect in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

One solution to the congestion problem described in the background of the invention would be to tune the system to have one of the devices behave differently. For instance, in the example provided above, the FibreChannel RAM Disk can be set such that the read rate or read size is reduced. This solution, however, requires anticipating the problem beforehand. It also requires knowledge of the drivers of the relevant endpoints/components. Many of these drivers may not be known without investigation, and such a solution would require constantly updating the system when new devices are attached.

In an embodiment of the present invention, a set of mechanisms are added that balance the rate of requests with the resulting data fulfilling the requests, reducing the maximum size of the destination queue and also ensuring that the destination bandwidth is not reduced to any source bandwidth. These mechanisms may be generically referred to as read pacing and read spacing.

The present invention may be applied to any protocol that permits the splitting of read requests and read completions. This includes, but is not limited to, PCIe, PCI-x, Infiniband, RapidIO, and Hypertransport. Additionally, the present invention may be applied to any system or protocol that has been modified to permit the splitting of read requests and read completions. Therefore, while legacy PCI does not typically support the splitting of read requests and read completions, if a system running legacy PCI were modified to permit such splitting, the invention could be applied to it.

Read pacing is based on the idea that only so many requests need to be outstanding at a time in order to ensure uninterrupted completion, and any extra read requests beyond that only cause queues to develop. A device with read pacing counts up, per source, how much data is requested in total. The counter may be labeled as "read count". Each additional request adds its read size to the read count. As the data is returned, the total read count is reduced according to the amount of data returned. Whenever the read count is larger than a threshold, subsequent requests from that source are held in the device and not forwarded to the final destination queue until the read count drops below the threshold again.

By placing a limit on the amount of data requests, the length of the final destination queue is similarly constrained. The limit is related to hardware resources on the device such that all requested data can be stored on the device without overflowing device buffer spaces. In other words, the threshold is related to the size of a completion buffer and the typical round trip time from read to completion. If, for example, all ports are reading 1 port (a typical host fanout application has all downstream ports read the main memory on the upstream port), then all completions arrive on one port (i.e. there is 1 destination buffer). If 4 ports are sharing the upstream completion buffer, then the threshold can only be ¼ as much as if there were only 1 aggressive reading device.

For purposes of this document, an aggressive reading device shall be interpreted to mean a device that sends out read requests in a manner that does cause the latency between it and the data source to exceed the typical latency.

For example, if there is about 28 KB of space in the buffer available for the upstream completion queue for the upstream port and there are 4 equally aggressive reading downstream ports, each port should get about ¼ of the buffer. Thus, the threshold for read pacing in this example may be set to approximately 7 KB.

It should be noted that there may be many different ways to enforce the threshold. One way, as described above, is to use a "read count" counter. Another way, however, would be to simply limit the size of the buffer so that it cannot possibly hold more data than the set threshold. In the above example, for instance, the buffer can simply be set with a size of 7 KB.

Turning now to read spacing, this addresses the case where multiple reads are sent closely together. If used together with read pacing, read spacing only is concerned with multiple reads when the threshold has not yet been exceeded. There is theoretically no need to send reads closer together than the data can be sent back. Therefore, by spreading out the read requests based on the rate that the source can utilize the resulting data, no performance is lost and the queue in the destination buffer is kept minimal. It should be noted that in one embodiment, the read rate may be higher than the data rate to account for times when the read request cannot be handled immediately by the destination. The read rate will develop a data buffer up to the limit specified by read pacing in order to smooth out completion data traffic.

In one embodiment of the present invention, the read spacing is set to allow the read rate to exceed the drain rate by no more than 2 times. However, this can be a programmable value. The reason to program it larger would be to fill an on-chip buffer more quickly, whereas a smaller value would fill it more slowly. If main memory is heavily congested, this means that there is likely multiple downstream branches feeding into it, since the CPU typically wins all accesses to main memory over other devices' accesses. For example, if a root complex has 2 or more downstream ports, each having a PCI switch feeding to yet even more downstream ports, and all downstream ports are trying to read the main memory simultaneously, then the memory controller may get overloaded.

The net effect of these mechanisms is to maintain destination bandwidth and reduce read request queue size in the memory controller, both of which will improve overall performance.

It should be noted that the term "read request queue" shall be interpreted to mean any queue that contains, or is designed to contain, read requests. Embodiments are possible where the queue also contains other requests or data. Such queues shall also be considered to be read request queues as long as they hold read requests.

The present invention may be implemented in various places in a computer I/O interconnect. For purposes of this document, a computer I/O interconnect shall be defined as a data transmission medium linking devices in a computer system. This may include, for example, a parallel multidrop bus, as is utilized in the PCI-x protocol. This may also include, for example, a point-to-point architecture, as is used in the PCI Express protocol.

FIG. 1 is a block diagram illustrating a system for controlling reads in a computer I/O interconnect in accordance with an embodiment of the present invention. Each component in the system may be embodied in hardware, software, or any combination thereof. In this diagram, there are five devices 100a-e connected to an I/O interconnect system. Devices 100a-100c may be connected to a switch 102. In the PCI Express and other similar protocols, devices that initiate a read request may be known as endpoints.

It should be noted that while a single switch is depicted in FIG. 1, one of ordinary skill in the art will recognize that multiple switches may be utilized in a parallel, serial, or hierarchical configuration in order to accomplish the same goals. The switch 102 may include an upstream read request queue 104a, 104b, 104c corresponding to each of the ports connected to devices 100a-100c. The switch 102 may be connected to a root complex 106. Also connected to the root complex 106 are devices 100d-100e. Like the switch 102, the root complex 106 may also contain an upstream read request queue 108a, 108b, 108c, here with queue 108a corresponding to the input from switch 102 and queues 108b and 108c corresponding to the inputs from devices 100d-100e. The root complex 106 controls a memory controller 110, which in turn may also house an upstream read request queue 112.

It should be noted that while read requests and read request queues are described in various portions of this specification, the present invention may also be applied to other types of requests and/or queues, and thus the claims are not to be limited to read requests or read request queues unless specifically stated.

Each upstream read request queue acts to hold incoming read requests until they can be acted upon by the device housing the queue. Once they are handled, they are placed in a downstream read request queue until they can be sent to another device.

The memory controller 110 may control main memory (not pictured). When a device 100a initiates a read request, the request may first pass to switch 102, where it is placed in upstream read request queue 104a. Once it has been acted upon by switch 102, it is placed in downstream read request queue 114 until it can be sent to root complex 106. Once it arrives at root complex 106, it is placed in upstream read request queue 108a. Once it has been acted upon by root complex 106, it is passed to memory controller 110, where it is placed in upstream read request queue 112. Once it has emerged from upstream read request queue 112, it is serviced and the appropriate completion response is formed from the information in memory.

This completion response may then be placed in completion queue 116. Once it has emerged from upstream completion queue 116, the completion response may be passed to root complex 106, where it is placed in an appropriate downstream completion queue (here, downstream completion queue 118a, which corresponds to the interconnect between the root complex 106 and switch 102, in contrast to downstream completion queues 118b and 118c, which correspond to the interconnects between the root complex 106 and devices 100d and 100e, respectively).

Once the completion has emerged from downstream completion queue 118a, it may be passed to switch 102, where it placed in upstream completion queue 120. Once the switch 102 has finished with the completion, it may be placed in downstream completion queue 122a, which corresponds to the interconnect between the switch 102 and the device 100a (in contrast to the downstream completion queues 122b and 122c, which correspond to the interconnects between the switch 102 and devices 100b and 100c, respectively).

Various aspects of the present invention may be implemented at any of the upstream read request queues. For purposes of this document, the term "final destination read request queue" may be defined as the read request queue closest to the destination where the underlying data to respond to the read request resides. In FIG. 1, for example, the upstream read request queue 112 is the final destination read request queue.

Figure 2:
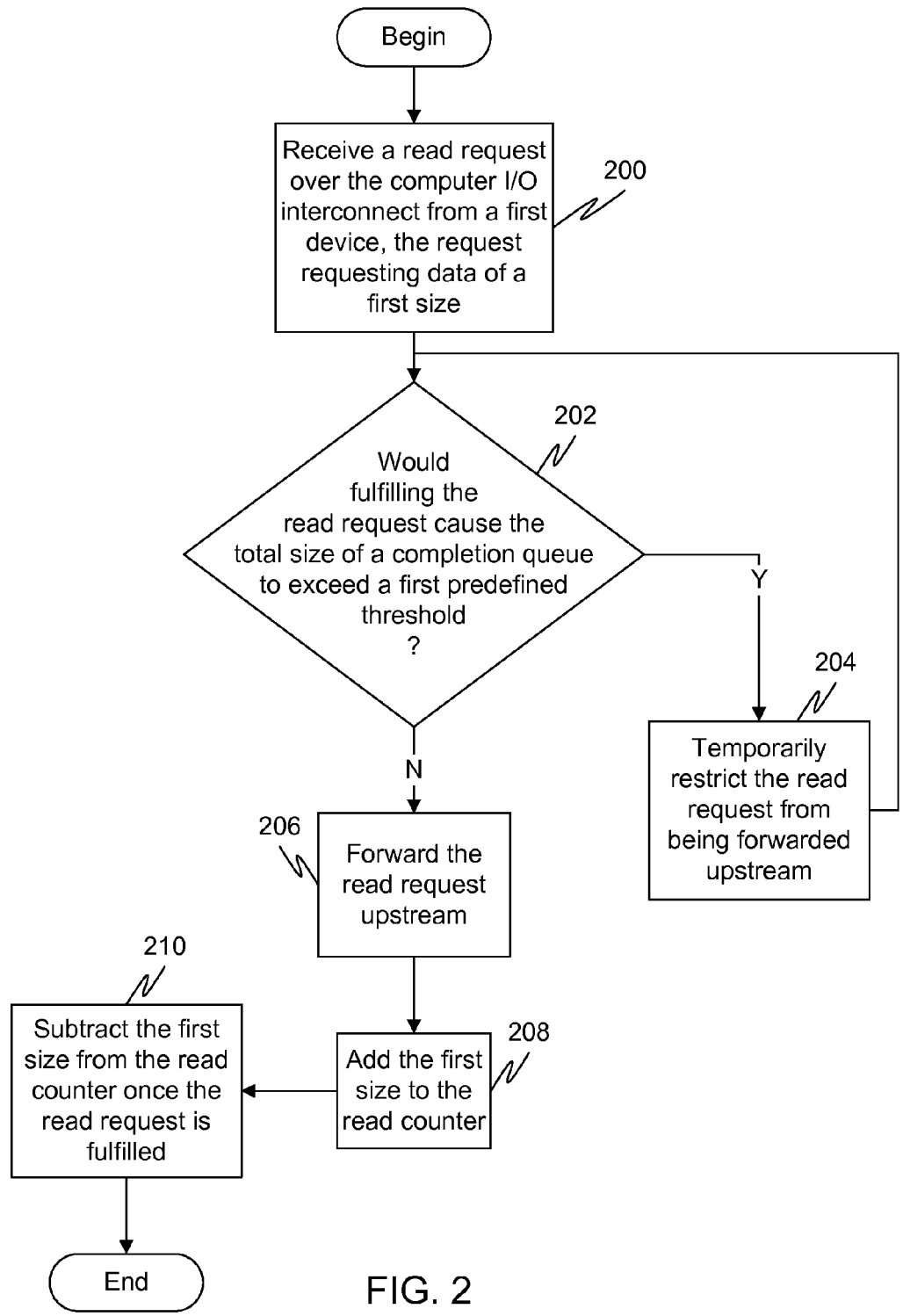
FIG. 2 is a flow diagram illustrating a method for controlling reads in a computer I/O interconnect in accordance with an embodiment of the present invention.

FIG. 2 is a flow diagram illustrating a method for controlling reads in a computer I/O interconnect in accordance with an embodiment of the present invention. Each step of this method may be performed in software, hardware, or any combination thereof. If performed in software, the method may be implemented as computer-readable instructions stored in a program storage device. This method may be generally termed "read pacing." This method may be performed by one or more components in a computer system. One of those components may be a root complex of a PCIe switch. Another component may be a switch. Another component may be a memory controller. At 200, a read request is received over the computer I/O interconnect from a first device, the request requesting data of a first size. At 202, it is determined whether fulfilling the read request would cause the total size of a completion queue to exceed a first predefined threshold. This determination may include adding the first size to a read counter and comparing the read counter to the first predetermined threshold. The first predetermined threshold may be set based on, for example, a size of memory available for the completion queue and a typical round trip time from read to completion from the upstream read request queue. This may include dividing the size of the memory available for the completion queue by the number of ports of the component controlling the upstream read request queue that are connected to an aggressive reading device.

If fulfilling the read request would cause the total size of the completion queue to exceed the first predefined threshold, then at 206 the read request is temporarily restricted from being forwarded upstream. If, on the other hand, fulfilling the read request would not cause the total size of the destination queue to exceed the first predefined threshold, then at 206 the read request may be forwarded upstream. Then at 208, the first size may be added to the read counter. At 210, once the read request is fulfilled, the first size may be subtracted from the read counter.

Figure 3:
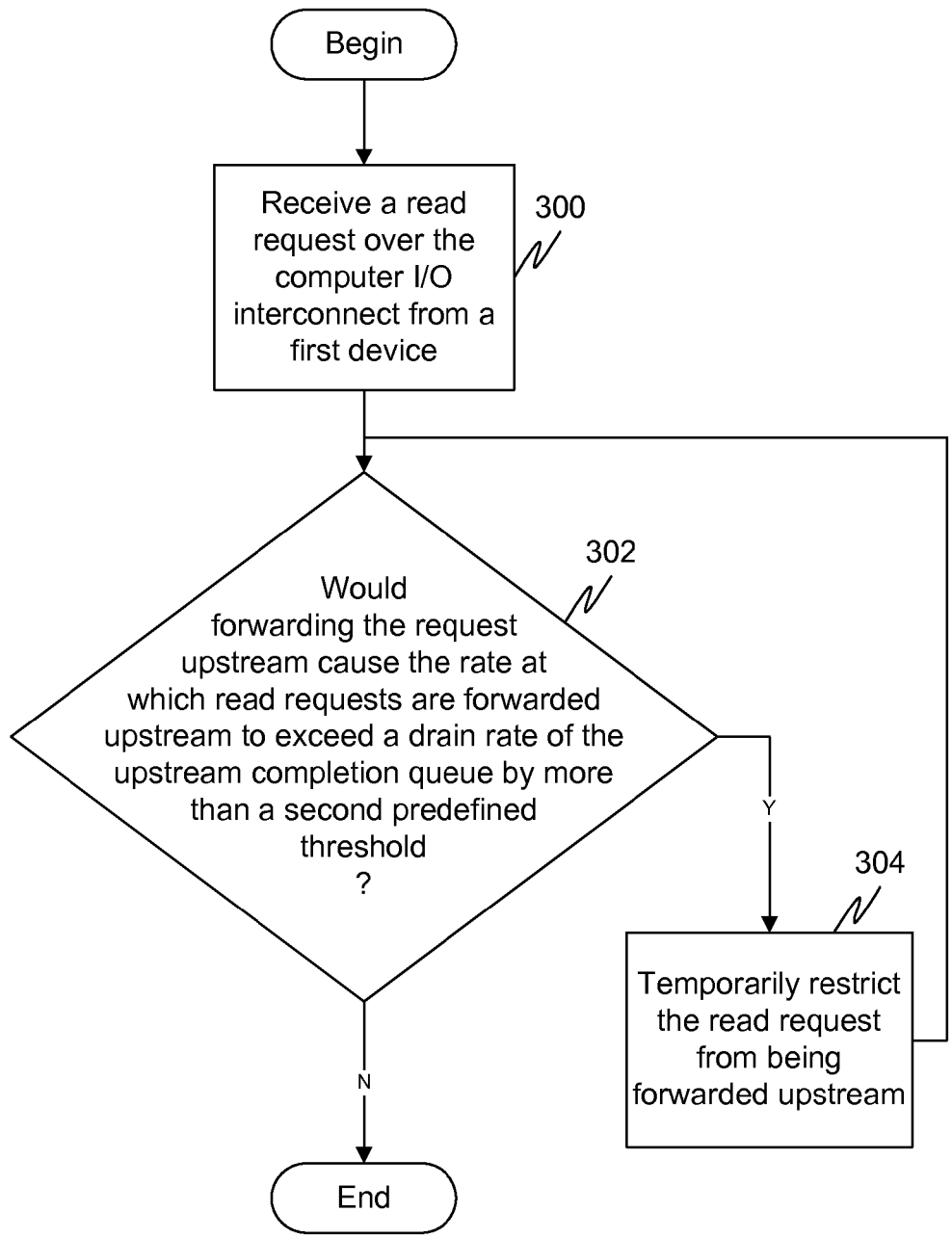
FIG. 3 is a flow diagram illustrating a method for controlling reads in a computer I/O interconnect in accordance with an embodiment of the present invention.

FIG. 3 is a flow diagram illustrating a method for controlling reads in a computer I/O interconnect in accordance with an embodiment of the present invention. Each step of this method may be performed in software, hardware, or any combination thereof. If performed in software, the method may be implemented as computer-readable instructions stored in a program storage device. This method may be performed by one or more components in a computer system. One of those components may be a root complex of a PCIe switch. Another component may be a switch. Another component may be a memory controller. At 300, a read request is received over the computer I/O interconnect from a first device. At 302, it is determined if forwarding the read request upstream would cause the rate at which read requests are forwarded upstream to exceed a drain rate of the completion queue by more than a second predefined threshold. This threshold may be expressed, for example, as a multiplication factor between the rate at which read requests are forwarded upstream and the drain rate of the completion queue. For example, the threshold may be set at two times the drain rate of the completion queue. If the rate at which read requests are forwarded upstream exceeds this, then the threshold has been breached. At 304, the read request is temporarily restricted from being forwarded upstream if forwarding the read request upstream would cause the rate at which read requests are forwarded upstream to exceed a drain rate of the completion buffer by more than a second predefined threshold.

It should be noted that while embodiments are foreseen wherein read pacing is performed without read spacing and vice-versa, in one embodiment of the present invention, both are performed. For example, the steps of FIG. 2 and FIG. 3 above may be combined into a single method, with the read spacing method being performed on read requests that would not cause the total size of a completion queue to exceed a first predefined threshold.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for controlling reads in a packetized computer input/output (I/O) interconnect compatible with a packetized computer I/O interconnect standard, the method comprising:

receiving a read request at a root complex over the packetized computer I/O interconnect from a first device compatible with the packetized computer I/O interconnect standard, the request requesting data of a first size;

determining whether adding the read request to a read request queue at the root complex would cause the total size of requested data in read requests from the first device currently stored in the read request queue to exceed a first predefined threshold, wherein the first predefined threshold is based on a round trip time between the root complex and a destination switch of the read request; and temporarily restricting the read request from being forwarded upstream to the destination switch of the read request if adding the read request to the read request queue would cause the total size of the requested data in read requests from the first device currently stored in the read request queue to exceed the first predefined threshold.

2. The method of claim 1, further comprising:

receiving a second read request at the root complex over the packetized computer I/O interconnect from a second device compatible with the packetized computer I/O interconnect standard;

determining whether adding the read request from the second device to the second read request queue would cause the total size of requested data in read requests from the second device stored in the read request queue to exceed a second predefined threshold, wherein the first predefined threshold is based on a round trip time between the root complex and a destination switch of the second read request;

if the second read request from the second device would not cause the total size of requested data in read requests from the second device stored in the read request queue to exceed the second predefined threshold, determining if forwarding the second read request upstream would cause the rate at which read requests are forwarded upstream to exceed a drain rate of a completion queue by more than a third predefined threshold; and temporarily restricting the second read request from the second device from being forwarded upstream if forwarding the second read request from the second device upstream would cause the rate at which read requests are forwarded upstream to exceed the drain rate of the completion queue by more than the third predefined threshold.

3. The method of claim 2, wherein the third predefined threshold is expressed as a multiplication factor between the rate at which read requests are forwarded upstream and the drain rate of the completion queue.

4. The method of claim 1, wherein the packetized computer I/O interconnect standard is PCIe.

5. The method of claim 1, wherein the first predefined threshold is based on the round trip time between the root complex and the destination switch of the read request and is determined by dividing a memory size available for a completion queue by a number of ports of the switch that are connected to aggressive reading devices.

6. The method of claim 1, wherein the determining includes adding the first size to a read counter corresponding to the first device and comparing the read counter to the first predetermined threshold.

7. The method of claim 6, further comprising, if fulfilling the read request would not cause the total size of the requested data in read requests from the first device currently stored in the read request queue to exceed the first predefined threshold:
  forwarding the read request upstream; and
  adding the first size to the read counter.

8. The method of claim 7, further comprising:
  when the read request is fulfilled, subtracting the first size from the read counter.

9. A root complex compatible with a packetized computer I/O interconnect standard, the root complex comprising:
  an upstream request queue;
  a downstream completion queue;
  an interface to a switch;
  an interface to a first device compatible with the packetized computer I/O interconnect standard; and
  a memory controller adapted to:
  receive a read request from the first device first device, the request requesting data of a first size from a device coupled to the switch;
  determine whether adding the read request to the read request queue would cause the total size of requested data in read requests from the first device currently stored in the read request queue to exceed a first predefined threshold, wherein the first predefined threshold is based on a round trip time between the root complex and the switch; and
  temporarily restrict the read request from being forwarded upstream to the switch if adding the read request to the read request queue would cause the total size of the requested data in read requests from the first device currently stored in the read request queue to exceed the first predefined threshold.

10. The root complex of claim 9, further comprising a different upstream read request queue for each connected device.

11. The root complex of claim 9, further comprising a different downstream completion queue for each connected switch.

12. An apparatus for controlling reads in a packetized computer input/output (I/O) interconnect compatible with a packetized computer I/O interconnect standard, the apparatus comprising:
  means for receiving a read request over the packetized computer I/O interconnect from a first device compatible with the packetized computer I/O interconnect standard, the request requesting data of a first size;
  means for determining whether adding the read request to a read request queue would cause the total size of requested data in read requests from the first device currently stored in the read request queue to exceed a first predefined threshold, wherein the first predefined threshold is based on a round trip time between the means for receiving and a destination switch of the read request; and
  means for temporarily restricting the read request from being forwarded upstream to the destination switch of the read request if adding the read request to the read request queue would cause the total size of the requested data in read requests from the first device currently stored in the read request queue to exceed the first predefined threshold.

13. The apparatus of claim 12, wherein the first predetermined threshold is determined by dividing a memory size available for a completion queue by a number of ports of the switch that are connected to aggressive reading devices.

14. The apparatus of claim 12, wherein the apparatus is a switch.

15. The apparatus of claim 12, wherein the means for determining includes means for adding the first size to a read counter corresponding to the first device and comparing the read counter to the first predetermined threshold.

16. The apparatus of claim 15, further comprising, means for, if fulfilling the read request would not cause the total size of the requested data in read requests from the first device currently stored in the read request queue to exceed the first predefined threshold:
  forwarding the read request upstream; and
  adding the first size to the read counter.

17. The apparatus of claim 16, further comprising:
  means for, when the read request is fulfilled, subtracting the first size from the read counter.

18. The apparatus of claim 12, wherein the first predetermined threshold is set based on a size of memory available for a completion queue.

* * * * *